United States Patent
Monroe et al.

(10) Patent No.: US 8,370,240 B2
(45) Date of Patent: ***Feb. 5, 2013

(54) SYSTEM AND METHOD FOR CHART PATTERN RECOGNITION AND ANALYSIS IN AN ELECTRONIC TRADING ENVIRONMENT

(75) Inventors: Charles Monroe, Alexandria, VA (US); Alvin F. Tanpoco, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,340

(22) Filed: Jun. 19, 2012

(65) Prior Publication Data

US 2012/0259766 A1    Oct. 11, 2012

Related U.S. Application Data

(63) Continuation of application No. 12/975,921, filed on Dec. 22, 2010, now Pat. No. 8,239,301, which is a continuation of application No. 12/697,766, filed on Feb. 1, 2010, now Pat. No. 7,882,002, and a continuation of application No. 11/417,933, filed on May 3, 2006, now Pat. No. 7,685,042, which is a continuation of application No. 10/882,594, filed on Jun. 30, 2004, now Pat. No. 7,599,867.

(51) Int. Cl.
    *G06Q 40/00* (2012.01)
(52) U.S. Cl. ............................................ 705/35; 705/37
(58) Field of Classification Search .................... 705/35, 705/37
    See application file for complete search history.

(56) References Cited

U.S. PATENT DOCUMENTS

| | | | |
|---|---|---|---|
| 5,465,308 A | 11/1995 | Hutcheson et al. | |
| 5,924,083 A | 7/1999 | Silverman et al. | |
| 5,946,666 A | 8/1999 | Nevo et al. | |
| 6,260,625 B1 | 7/2001 | Phan et al. | |
| 6,272,474 B1 | 8/2001 | Garcia | |
| 6,278,982 B1 | 8/2001 | Korhammer et al. | |
| 6,574,600 B1 | 6/2003 | Fishman et al. | |
| 6,691,094 B1 | 2/2004 | Herschkorn | |
| 6,694,054 B1 | 2/2004 | Gardes et al. | |
| 6,772,132 B1 | 8/2004 | Kemp, II et al. | |
| RE38,626 E | 10/2004 | Kielland | |
| 6,801,201 B2 | 10/2004 | Escher | |
| 6,907,404 B1 | 6/2005 | Li | |
| 7,127,424 B2 | 10/2006 | Kemp, II et al. | |
| 7,146,336 B2 | 12/2006 | Olsen et al. | |
| 7,181,423 B2 | 2/2007 | Blanchard et al. | |

(Continued)

OTHER PUBLICATIONS

Elder, IV, John F. and Finn, Mark T., "Creating 'Optimally Complex' Models for Forecasting," *Financial Analysts Journal*, Jan./Feb. 1991, vol. 47, No. 1, pp. 73-79.

*Primary Examiner* — Thomas Dixon
*Assistant Examiner* — Benjamin S Fields
(74) *Attorney, Agent, or Firm* — McDonnell Boehnen Hulbert & Berghoff LLP

(57) ABSTRACT

A system and method are provided for chart pattern recognition and analysis. In one embodiment, a graphical interface is provided to enable a trader to select a portion of a chart to be used in the chart pattern analysis. The pattern of the selected portion of the chart could then be used to find one or more similar chart patterns in a user-defined timeframe, such as any future time period or a time period in the past. When a reoccurring chart pattern is found in any future time period, an alert signal can be generated to alert a user of a possibility of the chart pattern reoccurrence. Alternatively, chart pattern matches can be found in a time period in the past, and a set of studies can be applied to the found matches to generate a set of reoccurring indicator values. The reoccurring indicator values can be used in combination with the chart pattern to detect any similar chart patterns in the future.

21 Claims, 5 Drawing Sheets

U.S. PATENT DOCUMENTS

| | | |
|---|---|---|
| 7,356,501 B2 | 4/2008 | Churquina |
| 7,389,268 B1 | 6/2008 | Kemp, II et al. |
| 7,562,042 B2 | 7/2009 | Lo et al. |
| 7,590,587 B2 | 9/2009 | Duquette |
| 7,599,867 B1 | 10/2009 | Monroe et al. |
| 7,680,721 B2 | 3/2010 | Cutler |
| 7,685,042 B1 | 3/2010 | Monroe et al. |
| 7,827,091 B2 | 11/2010 | Cutler et al. |
| 7,882,002 B2 | 2/2011 | Monroe et al. |
| 2002/0007331 A1 | 1/2002 | Lo et al. |
| 2002/0120551 A1 | 8/2002 | Jones |
| 2003/0004853 A1 | 1/2003 | Ram et al. |
| 2003/0009411 A1 | 1/2003 | Ram et al. |
| 2003/0069834 A1 | 4/2003 | Cutler |
| 2003/0139989 A1 | 7/2003 | Churquina |
| 2004/0225592 A1 | 11/2004 | Churquina |
| 2005/0021443 A1 | 1/2005 | Beard et al. |
| 2005/0080710 A1 | 4/2005 | Malato |
| 2005/0187854 A1 | 8/2005 | Cutler et al. |
| 2005/0228735 A1 | 10/2005 | Duquette |
| 2011/0093373 A1 | 4/2011 | Monroe et al. |

SYSTEM AND METHOD FOR CHART PATTERN RECOGNITION AND ANALYSIS IN AN ELECTRONIC TRADING ENVIRONMENT

CROSS REFERENCE TO RELATED APPLICATIONS

This application is a continuation of U.S. patent application Ser. No. 12/975,921, filed Dec. 22, 2010, now issued as U.S. Pat. No. 8,239,301, entitled "System and Method for Chart Pattern Recognition and Analysis in an Electronic Trading Environment," which is a continuation of U.S. patent application Ser. No. 12/697,766, filed Feb. 1, 2010, entitled "System and Method for Chart Pattern Recognition and Analysis in an Electronic Trading Environment," now issued as U.S. Pat. No. 7,882,002, which is a continuation of U.S. patent application Ser. No. 11/417,933, filed May 3, 2006, now issued as U.S. Pat. No. 7,685,042, entitled "System and Method for Chart Pattern Recognition and Analysis in an Electronic Trading Environment," which is a continuation of U.S. patent application Ser. No. 10/882,594, filed Jun. 30, 2004, now issued as U.S. Pat. No. 7,599,867, entitled "System and Method for Chart Pattern Recognition and Analysis in an Electronic Trading Environment" the contents of which are fully incorporated herein by reference.

FIELD OF INVENTION

The present invention is directed to chart analysis. More specifically, the present invention is directed to chart pattern recognition and analysis in an electronic trading environment.

BACKGROUND

An exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may log onto an electronic exchange trading platform by way of a communication link through their user terminals. Once connected, buyers and sellers may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

Every day, there are thousands of traders buying and selling for many different reasons, such as, for example, fear of loss, hope of gain, hedging, broker recommendations, and many others. To profit in electronic markets, market participants must be able to assimilate large amounts of data in order to recognize market trends and to view current market conditions. However, trying to figure out why market participants are buying or selling can be very difficult. Chart patterns may put buying and selling activities into perspective by providing a concise picture of the two activities as a tool to analyze markets.

Identifying chart patterns is a form of what is often referred to as technical analysis based on an assumption that market trends repeat themselves. Technical analysis consist primarily of a variety of technical studies, which, when interpreted, are used by many traders to predict market trends, and detect buy/sell signals. A trend is a direction in which the market is moving, and a slope of a trend line can be used in market analysis. Typically, the movement or price development does not occur as a straight line, but rather consists of a series of successive peaks and troughs, and it is actually a direction in which the peaks and troughs are moving what many consider a market trend. For example, an uptrend line is a straight line passing through the rising of an up-move. A reversal of such a trend line is indicated with a violation of the uptrend line, and is often interpreted as a selling opportunity. On the other hand, as long as the uptrend line is intact, it is often considered a low-risk buying area. As another example, the trend lines drawn parallel through the tops and bottoms result in a channel formation, and the market movement to the top of an upward channel is often considered a selling opportunity.

Another use of technical analysis, apart from technical studies, is in deriving "support" and "resistance" levels, which can be used by a trader to provide additional information about possible market movements. The general consensus is that the market will tend to trade above its support levels and below its resistance levels. For example, in a falling market, a support level is a price level where buyers entered the market or where old sellers liquidated their shorts with enough force to keep price from going any lower. In a rising market, a resistance level is a price level where sellers entered the market or where old buyers liquidated their long positions with enough force to keep prices from going any higher. Therefore, in general, it is often said that that in an up-trend the test to support can be used as an indicator of a buying opportunity, and the same is true when a break is detected in a resistance level. On the other hand, in a downtrend movement, a resistance zone is considered as an indicator of a selling opportunity.

Even though there are many existing tools that enable traders to analyze market conditions using technical analysis or the like, traders are often not given enough flexibility as to which portions of the market data should be taken in consideration when performing the analysis. Additionally, traders are often interested in reevaluating their trading decisions in view of a specific portion of historical market data so that they can avoid mistakes made in the past, or that they can develop new strategies for the future. Therefore, it would be beneficial to provide a system along with a graphical interface that can be used by traders to perform technical analysis according to the trader's preferences.

BRIEF DESCRIPTION OF THE DRAWINGS

Example embodiments of the present invention are described herein with reference to the following drawings, in which.

DETAILED DESCRIPTION

Figure 1:
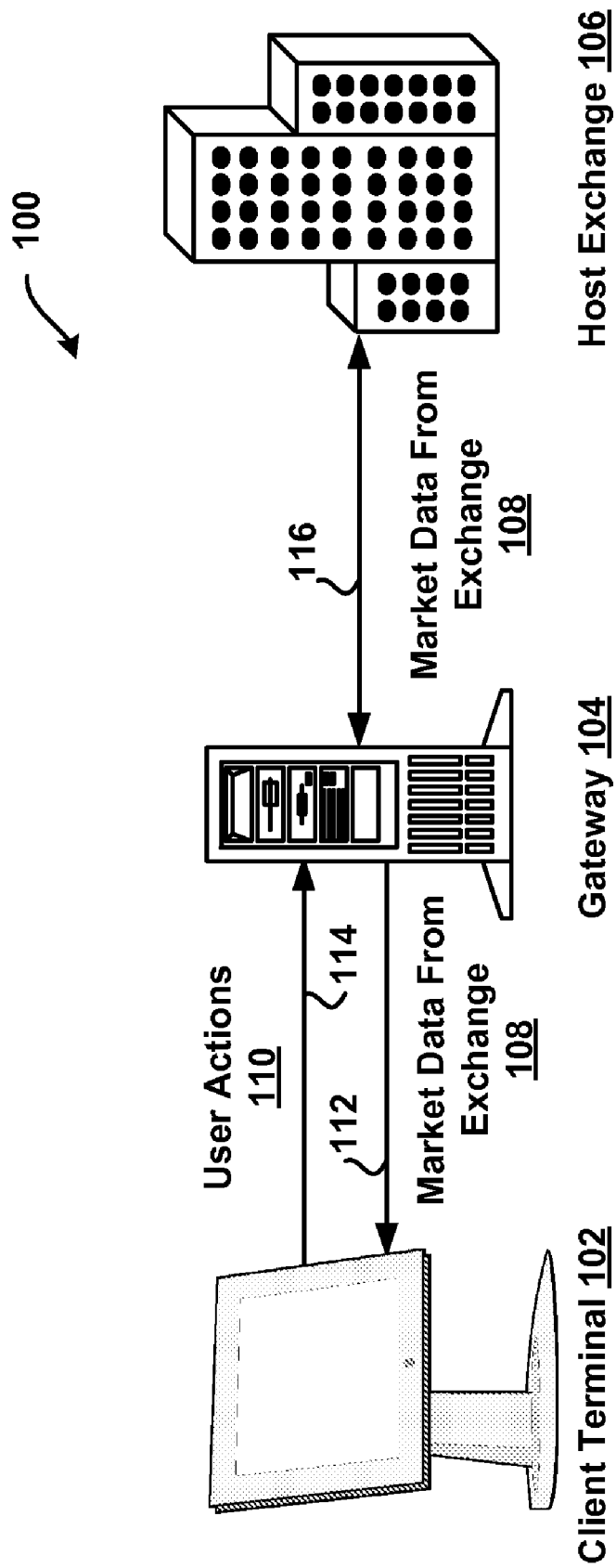
FIG. 1 is a block diagram illustrating an example network configuration for a communication system utilized to access one or more exchanges.

I. Chart Pattern Recognition and Analysis Overview

The preferred embodiments are provided, among other things, to facilitate chart pattern recognition and analysis. In one aspect of the preferred embodiments, a graphical user interface may display a chart representing market data, such as traded prices or traded volume, related to a tradeable object being traded at one or more exchanges. The user may then select a portion of the chart to be used in market pattern recognition and analysis. In an embodiment involving market pattern recognition, once the user selects a portion of a chart, a pattern recognition application may use the characteristics of the selected chart portion to search for similar chart patterns in the future. Once the similar chart pattern is detected, the pattern recognition application may notify a user of the possible reoccurrence of the chart pattern so that the user can take advantage of any potential trading opportunities. It should be understood that the user could define a time period in the future to be used by the pattern recognition application to find similar chart patterns.

In another embodiment, a user may wish to analyze the selected chart pattern. In such an embodiment, the user could define a time period in the past, and the pattern recognition application can search for similar chart patterns in the portion of the chart corresponding to the user specified time period. Once the pattern recognition application finds in the specified time period one or more chart instances having similar chart pattern characteristics to those of the chart portion selected by the user, the pattern recognition application may display the found chart instances to a user. The user may then select which of the displayed chart instances will be used in the chart analysis by simply removing the chart instances that do not fit into the selected chart pattern. The chart analysis can be performed by applying a number of chart studies to the selected chart instances to determine reoccurring indicator values corresponding to the selected chart instances. In another embodiment, when the pattern recognition application finds the chart instances that match the selected chart pattern, the pattern recognition application may select chart portions before and after each found chart instance. In such an embodiment, the chart studies that were applied to the matched chart pattern instances can be also applied to chart portions before and after each found chart instance so that a user can view indicator values that lead to the specific chart pattern and another set of indicator values that followed the chart pattern. Different embodiments are possible as well.

While the present invention is described herein with reference to illustrative embodiments for particular applications, it should be understood that the present invention is not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the present embodiments may be operated in an entirely software embodiment, in an entirely hardware embodiment, or in a combination thereof. However, for sake of illustration, the preferred embodiments are described in a software-based embodiment, which is executed on a computer device. As such, the preferred embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

In an electronic trading environment, when a trader selects a tradeable object, the trader may access market data related to the selected tradeable object(s). Referring to FIG. 1, an example communication that might occur between an electronic exchange and a client terminal in accordance with the preferred embodiments is shown. During a trading session, market data 108, in the form of messages, may be relayed from a host exchange 106 over communication links 116 and 112 to a client terminal generally indicated as 102. As illustrated in FIG. 1, intermediate devices, such as gateway(s) 104, may be used to facilitate communications between the client terminal 102 and the host exchange 106. It should be understood that while FIG. 1 illustrates the client terminal 102 communicating with a single host exchange, in an alternative embodiment, the client terminal 102 could establish trading sessions to more than one host exchange.

The market data 108 contains information that characterizes the tradeable object's order book including, among other parameters, order related parameters, and the inside market, which represents the lowest sell price (also referred to as the best or lowest ask price) and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as total traded quantity for each price level, an opening price, last traded price, last traded quantity, the closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

Typically, a trader may view the information provided from an exchange via one or more specialized trading screens created by software running on the client terminal 102. Upon viewing the market information or a portion thereof, a trader may wish to take actions, such as send orders to an exchange, cancel orders at the exchange, or change order parameters, for example. To do so, the trader may input various commands or signals into the client terminal 102. Upon receiving one or more commands or signals from the trader, the client terminal 102 may generate messages that reflect the actions taken, generally shown at 110. It should be understood that different types of messages or order types can be submitted to the host exchange 106, all of which may be considered various types of transaction information. Once generated, user action messages 110 may be sent from the client terminal 102 to the host exchange over communication links 114 and 116.

III. System Function and Operation

Figure 2:
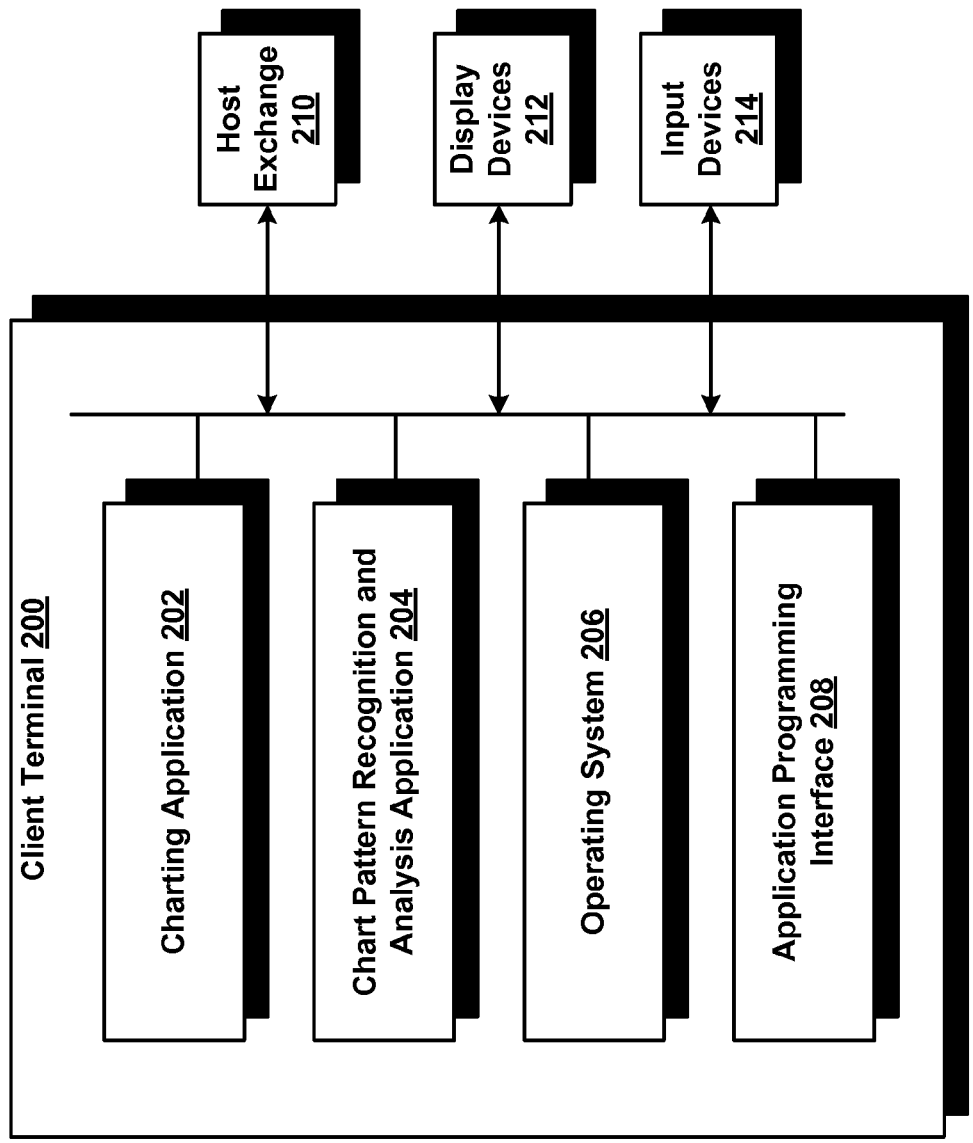
FIG. 2 is a block diagram illustrating an example client device with a number of layers defining different stages that can be used to implement embodiments of the present invention.

FIG. 2 is a block diagram illustrating a client device 200 with a number of layers defining different stages that may be used to implement embodiments of the present invention. The layers include a charting application 202, a chart pattern recognition and analysis application 204, an operating system 206, and an application programming interface ("API") 208. The client device 200 also preferably includes, among other things, at least a processor and memory (both of which are not shown in figure, but are well known computer components). Preferably, the processor has enough processing power to handle and process various types of market information. Therefore, the more market information is received and processed, the more processing power is preferred. However, any present day processor has enough processing power to handle and process various types of market information. Also, it should be understood that memory may include any computer readable medium. The term computer readable medium, as used herein, refers to any medium that participates in providing instructions to a processor unit for execution.

Preferably, the charting application 202 and the chart pattern recognition and analysis application 204 have access to market information from one or more host exchanges 210 through an interface, such as the API 208. It should be understood that the charting application 202 could be included in the chart pattern recognition and analysis application 204 or could be a separate application, such as illustrated in FIG. 2. When the charting application 202 receives information from the host exchange 210, it may arrange and display the received information on a chart that a trader may view on the visual output display device 212. The display device 212 could be CRT-based video displays, LCD-based displays, gas plasma-panel displays, displays that show three-dimensional images, different display types, or the combination thereof.

The charting application 202 could also interact with a trading application (not shown) to keep track of trades being made by a trader. A commercially available trading application that allows a user to trade is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. However, the preferred embodiments are not limited to any particular product that performs translation, storage and display functions.

Portions of the X_TRADER® and the MD Trader™-style display are described in U.S. patent application Ser. No. 09/590,692, now issued as U.S. Pat. No. 6,772,132, entitled "Click Based Trading With Intuitive Grid Display of Market Depth," filed on Jun. 9, 2000, U.S. patent application Ser. No. 09/971,087, now issued as U.S. Pat. No. 7,127,424, entitled "Click Based Trading With Intuitive Grid Display of Market Depth and Price Consolidation," filed on Oct. 5, 2001, and U.S. patent application Ser. No. 10/125,894, now issued as U.S. Pat. No. 7,389,268, entitled "Trading Tools for Electronic Trading," filed on Apr. 19, 2002, the contents of each are incorporated herein by reference.

In the embodiment where the charting application 212 interacts with the trading application, the charting application 212 could automatically mark the chart when the trader submits orders to an exchange, and/or when each order is executed. It should be understood that the indicators used on the chart could be user-configurable. Also, in addition to automatically marking points related to the orders being submitted by the trader, the charting application 212 could also allow the trader to manually mark other points of interest on the chart so that the trader can later easily identify his points of interest. It should be understood that a trader could control what data is plotted on the chart.

The chart pattern recognition and analysis application 204 may allow a user to select a portion of a chart to be used in the chart pattern recognition process, chart analysis, or both. In an embodiment involving the chart pattern recognition, once a user selects a portion of a chart, the chart pattern recognition and analysis application 204 may use the characteristics of the selected chart portion to search for similar chart patterns in the future. It should be understood that a user could define a time period that should be used by the chart pattern recognition and analysis application 204 to look for similar chart patterns. The chart pattern recognition and analysis application 204 could use many different methods to detect similar chart patterns. One such method includes the Pearson's correlation analysis or genetic algorithms. However, it should be understood that different statistical analysis could also be used for detecting similar chart patterns.

In another embodiment, a user may wish to analyze the selected chart pattern. In such an embodiment, the user could define a time period in the past, and the chart pattern recognition and analysis application 204 can search for similar chart patterns in the user-defined time frame. Once the chart pattern recognition and analysis application 204 finds chart instances having similar chart pattern characteristics to those of the user-selected chart portion, the found matches can be displayed to a user. The user can then make the final determination which of the found matches will be used in the chart analysis. Once the selection is made, the chart pattern recognition and analysis application 204 can analyze the chart portions by applying a number of chart studies to the selected chart matches. For example, a chart study may look for common values of one or more technical indicators that have occurred during the time periods corresponding to the selected chart matches, the examples of which will be described in greater detail below.

The display devices 212 could be CRT-based video displays, LCD-based displays, gas plasma-panel displays, displays that shows three-dimensional images, or different display types. Also, the display device could be a combination of separate display devices that can together create a composition in the user's visual field, such as a head-mounted monocular see-through display that holds the chart or study results that is used together with another display that holds another interface, such as a trading interface. The chart application 202 may also receive input signals from a trader via input devices 214. Example input devices may include a mouse, a keyboard, a game pad, or a stylus in the systems using touch-screen display devices. However, different input devices could also be used. As mentioned in reference to the preceding paragraph, the input signals received from a user may include an input selecting one or more chart portions to be used by the pattern recognition application 204 for analysis.

The operating system 206 may be used to manage hardware and software resources of the client terminal 200. General functions of the operating system 206 may include processor management, memory management, device management, storage management, application interface, and user interface. Any type of the operating system 206 may be used to implement the present embodiments, and examples of common operating systems include the Microsoft WINDOWS family of operating systems, the UNIX family of operating systems, or the MACINTOSH operating systems. However, those ordinarily skilled in the art will recognize that the added complexity of an operating system may not be necessary to perform the functions described herein.

Figure 3:
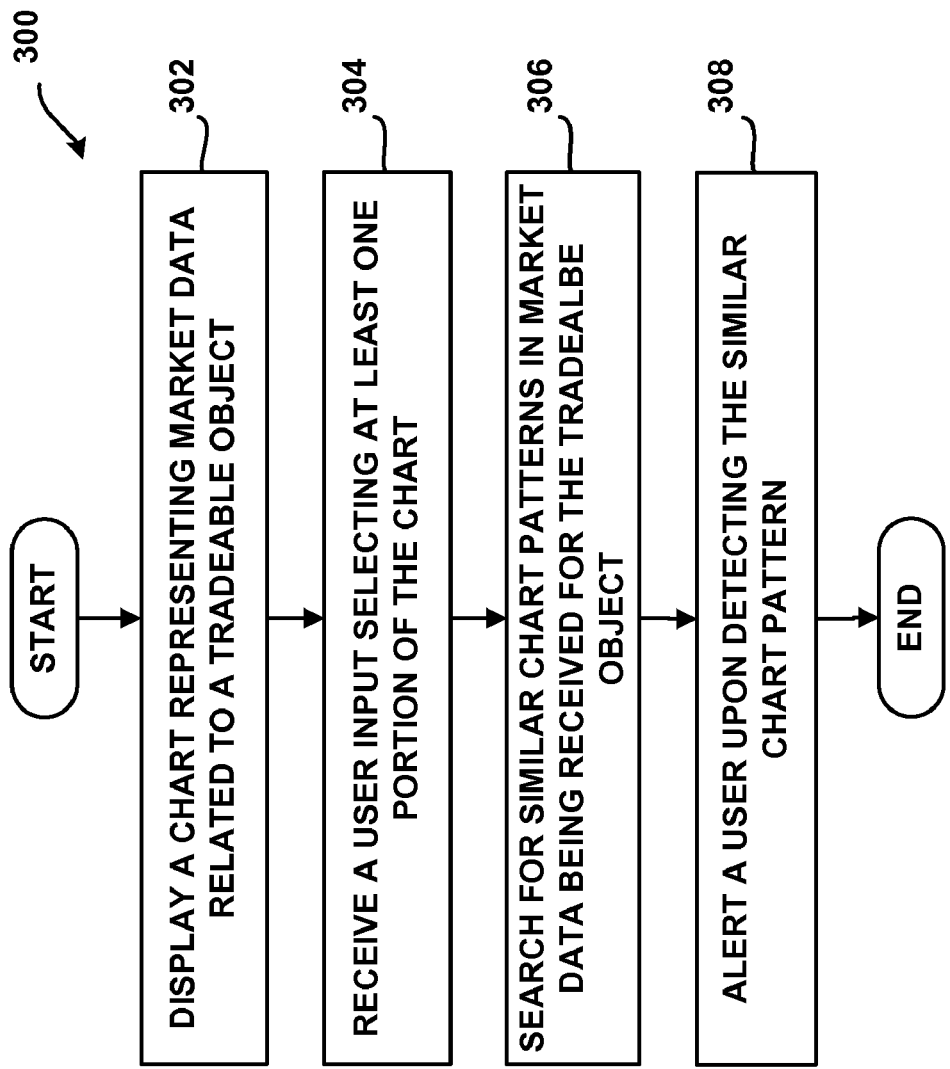
FIG. 3 is a flow diagram illustrating operation and function of a possible implementation of example embodiment for detecting chart patterns.

FIG. 3 is a flow diagram 300 illustrating operation and function of a possible implementation of one preferred embodiment for recognizing chart patterns. It should be understood that each block in this and any subsequent flow diagrams may represent a module segment or a portion of code, which includes one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. The flow diagram 300 will be described in relation to the elements of the client terminal in FIG. 2. However, it should be understood that more, fewer, or different components could also be used to execute the method 300.

At step 302, the charting application 202 displays a chart representing market data related to a tradeable object. It should be understood that different items of interest related to a tradeable object could be used, and the example embodiments are not limited to any specific charting methods or chart types. For example, the charting application 202 could use line charts, bar charts, candlestick charts, or different chart types. A line chart includes a line that is formed by connecting values of the selected item of interest over a period of time. A bar chart consists of a number of vertical bars, where each bar corresponds to a predetermined time period, such as an hour, a day, a week, or a month, for example. Also, using the bar chart, the top and the bottom of each bar defines the high and low values corresponding to the plotted variable. In addition to the high and low values, each bar could also display the opening and closing values (or any other values) in the format of short horizontal lines extending to the right and left of each bar. In turn, the candlestick charts display open, high, close, and low values, and use white (clear) candlesticks when the closing value is higher then the opening value, and black (solid) candlesticks when the closing value is lower than the opening value. It should be understood that the chart could display different values related to the tradeable object, including, but not limited to, prices or traded quantities. Also, in another alternative embodiment, rather that displaying a chart, the charting application 204 could display a market profile. The market profile is a statistical display of price activity over a specified time interval, and different letters are used to represent a time price opportunity—a specific half-hour time segment, or any other time interval, in which that price occurred on a specific day. However, different chart types could also be used.

At step 304, the charting application 204 receives a user input selecting at least one portion of the chart to be analyzed according to the preferred embodiments. In one embodiment, the charting application 202 can provide a drawing function enabling a user to select a desired portion of the chart. Alternatively, a trader could specify one or more time periods that can be used by the pattern recognition application 204 as a reference to select a portion of the chart corresponding to the selected time period.

At step 306, the pattern recognition application 204 searches for similar chart patterns using tradeable object related data being received from at least one electronic exchange. It should be understood that different methods could be used to determine if the chart pattern being monitored by the pattern recognition application 204 resembles the selected chart pattern. In one example embodiment, the pattern recognition application 204 could determine if the chart pattern fits into any standard chart pattern, such as if it corresponds to a falling market, a rising market, or any other commonly known patterns including, but not limited to, market reversals or continuations. For example, the reversal pattern may include a double top pattern, a double bottom pattern, a head and shoulder pattern, a rounding bottom and top pattern, a wedge, a hammer, or any other user-configurable patterns. As an example, the double top pattern is typically detected when the market falls twice at a resistance level and then sharply reverses, while the double bottom pattern is just the opposite of the double top. Then, as an example of a continuous pattern, the pennant occurs when the market pattern resembles a small symmetrical triangle, and it is a brief pause in a strongly trending market. Also, different chart pattern characteristics could also be used, such as slopes of the trend lines that could be drawn in relation to the selected chart pattern. The slopes of the trend lines could then be used as part of the method for recognizing similar chart patterns by the chart pattern recognition application 204. However, it should be understood that rather than trying to match the selected chart portion to any existing chart pattern, the chart pattern recognition application 204 could use any other statistical techniques to determine if any currently occurring chart patterns matches characteristics of the selected chart pattern. Preferably, the chart pattern recognition application 204 may search for the similar chart patterns until the end of a user-specified time period, such as until the end of a trading day, or for any other user-specified time period.

Once the chart pattern recognition application 204 detects a similar chart pattern, at step 308, the chart pattern recognition application 204 may alert a user. It should be understood that many different alerts could be used, including, but not limited to, any visual or audio alerts, or a combination thereof. For example, the chart pattern recognition application 204 could alert a user by displaying indicators in relation to the chart, flashing a portion of the chart, or providing an audio signal to a user. Once a user is alerted, the user may take any actions, such as open new position or close any existing positions, or yet some other actions, to take advantage of the detected chart pattern.

Figure 4:
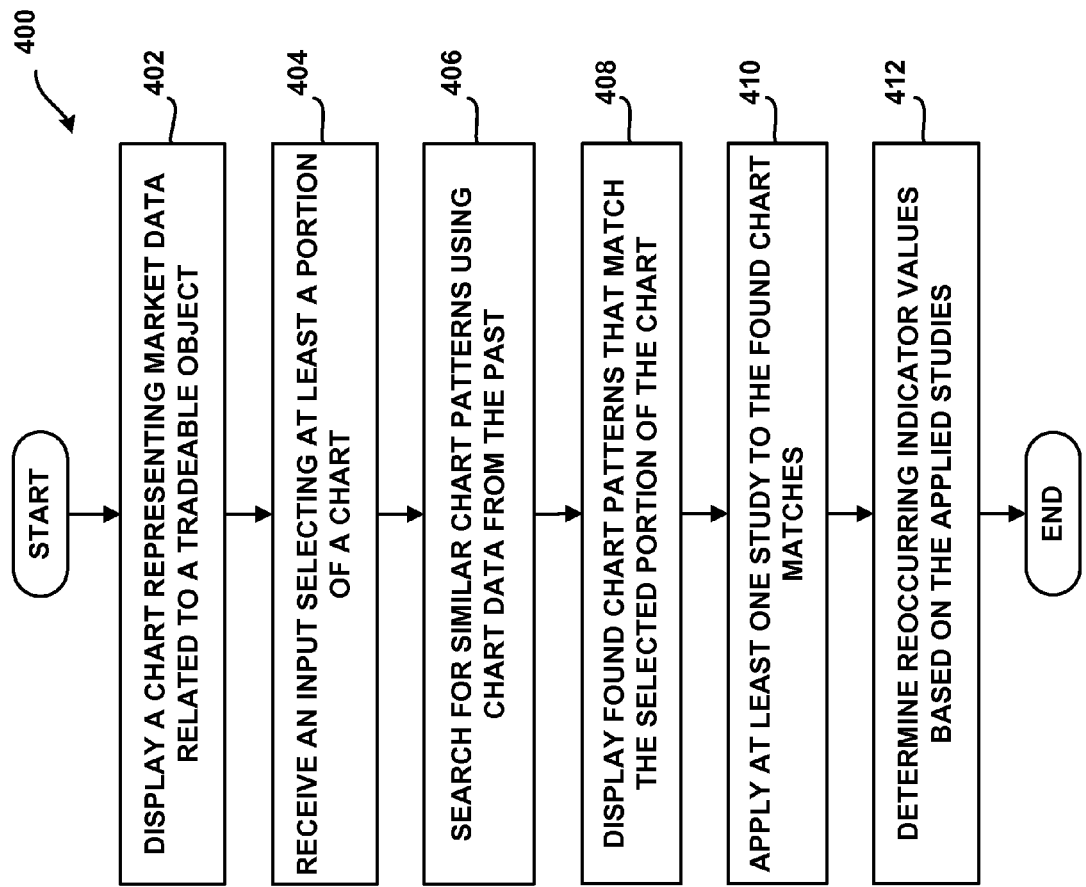
FIG. 4 is a flow diagram illustrating operation and function of a possible implementation of example embodiments for analyzing chart patterns.

FIG. 4 is a flow diagram 400 illustrating operation and function of a possible implementation of the preferred embodiments for analyzing charts. The flow diagram 400 will be described in relation to the elements of the client terminal in FIG. 2. However, it should be understood that more, fewer, or different components could also be used to execute the method 400.

At step 402, the charting application 202 displays a chart representing market data related to a tradeable object. As described in reference to FIGS. 3A and 3B, different chart types could be used to represent the market data, and the example embodiments are not limited to any particular chart types or market profiles.

At step 404, the chart pattern recognition and analysis application 204 receives a user input indicating a selection of at least a portion of the chart to be used in the chart analysis according to the preferred embodiments. A user can make the selection using a drawing function with respect to the chart, by specifying a time period to be used by the chart pattern recognition and analysis application 204 as a reference to select the portion of the chart, or via some other selection means.

At step 406, the chart pattern recognition and analysis application 204 may search for similar chart patterns using chart data from the past. In one embodiment, a user could specify a time period, such as the last two hours, the last month, the last year, or some other time interval to be used by the chart pattern recognition and analysis application 204 to search for similar chart patterns. As mentioned in reference to FIG. 3, any statistical analysis could be used to determine if a portion of a chart in the past is similar to the selected chart pattern. Also, any default time period could be used for the search. When the pattern recognition and analysis application 204 finds one or more matches, at step 408, the application can display the matches to a user via the display devices 212. Once the matches are displayed, the user could decide which of them should be used in the analysis. Alternatively, all found matches can be automatically used in the analysis.

At step 410, the chart pattern recognition and analysis application 204 applies at least one study to the found chart matches. In one preferred embodiment, the studies can be used to determine reoccurring indicator values corresponding to the found chart matches under the study. It should be understood that the example embodiments are not limited to any specific technical studies. As an example, technical studies may include determining values of a rate-of-change ("ROC") indicator, a relative strength indicator ("RSI"), an average true range ("ATR"), or a standard deviation study. The ROC is a momentum oscillator that measures the percent change in price from one time period to the next. For example, a 10-day ROC can be determined by dividing the latest closing price by the closing price 10 days ago. The RSI is a bounded momentum oscillator that compares the magnitude of the recent gains in currency to the magnitude of the recent losses. Then, the ATR measures volatility, while the standard deviation measures a difference between the selected set of values corresponding to an indicator compared to the average value of the indicator.

In one preferred embodiment, when the chart pattern recognition and analysis application 204 applies a technical study to a set of selected chart pattern matches, the chart pattern recognition and analysis application 204 may determine a set of reoccurring indicator values, such as a set of reoccurring ROC indicator values. In an embodiment where the chart pattern and analysis application 204 also analyzes portions of a chart corresponding to the time periods before and after the found matches, the application 204 can also analyze those chart portions so that a user could get a better idea what set of reoccurring indicator values has lead to or followed the selected chart pattern. It should be understood that a trader could define the time periods to be used as a reference for selecting chart portions that proceed and follow each found chart pattern match. In such an embodiment, the chart pattern recognition and analysis application 204 could determine three sets of reoccurring indicator values for the chart portions proceeding, during and after the found matches. For example, the chart pattern recognition application 204 could determine that the indicator values stayed within a specific range, or was above/below a certain value most of the time during a time period corresponding to each found chart match or during a time period before or after the found match. It should be understood that many different methods could be used to determine a reoccurring indicator range corresponding to the found chart pattern matches.

At step 412, the chart pattern recognition and analysis application 204 may display results of each study to a user on the display devices 212. In the embodiment where the pattern recognition and analysis application 204 determines the most often occurring range of values corresponding to one or more indicators, the range of values corresponding to each indicator can be displayed to a user. For example, the pattern recognition and analysis application 204 may determine that the RSI indicator value was between a first value and a second value, such as between 70 and 80, during the time period corresponding to each found match. Alternatively, rather than providing a range of reoccurring indicator values, the pattern recognition and analysis application 204 could specify that during the major portion of the time period, such as 80% of the time, the RSI indicator value was higher than 75 or was around 75. It should be understood that the level of detail provided to a trader may vary based on user preferences. The indicator values could later be used by the pattern recognition and analysis application 204 to help the application in detecting similar chart patterns in any future market data.

Figure 5:
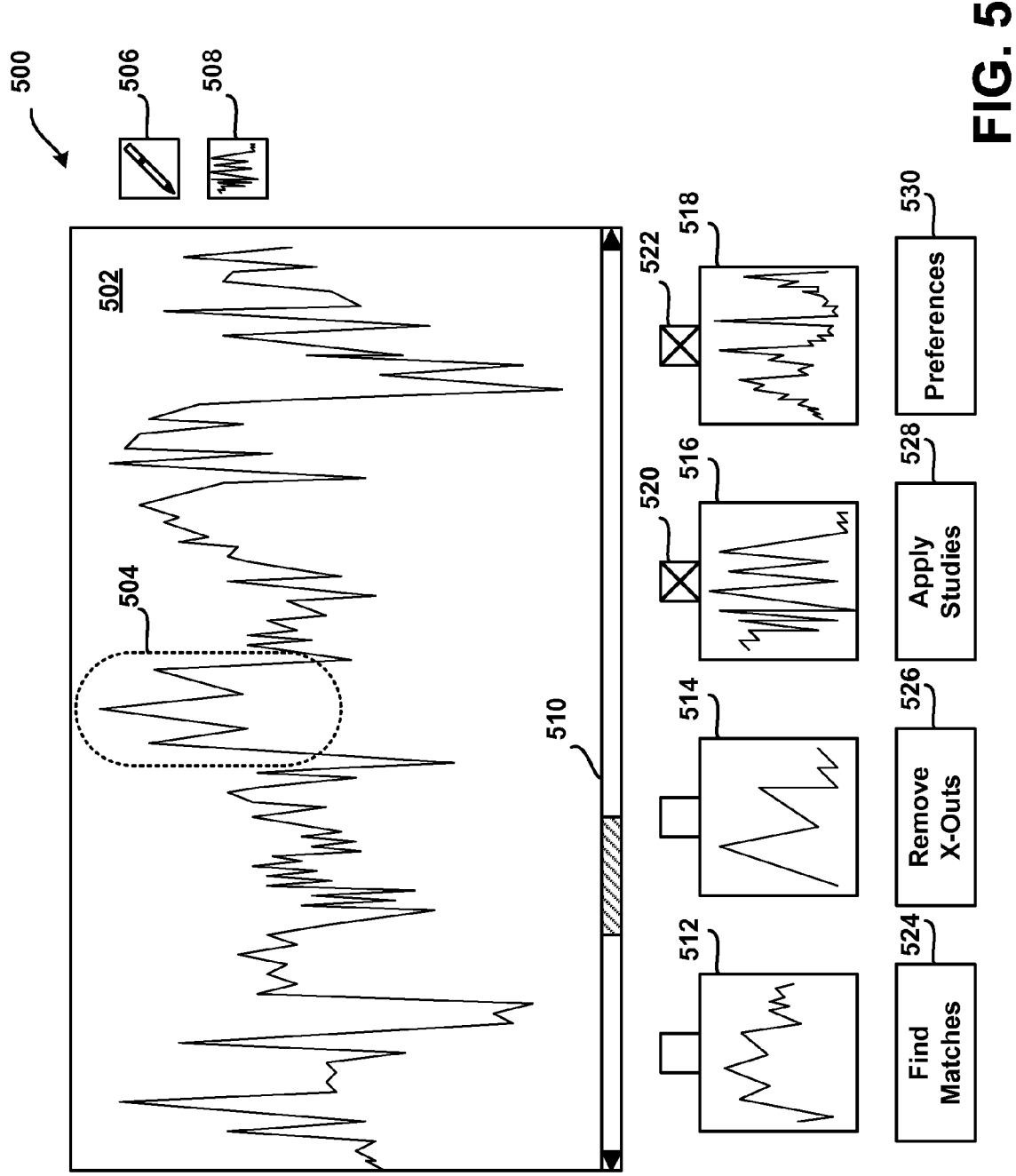
FIG. 5 is a block diagram illustrating an example graphical user interface that can be used in example embodiments for chart pattern recognition and analysis.

As mentioned in the preceding paragraphs, in a preferred embodiment, a trader can interact with the pattern recognition application 204 and the charting application via a graphical user interface. FIG. 5 is a block diagram illustrating an example graphical user interface 500 that can be used by a trader to perform chart pattern recognition and analysis according to the preferred embodiments.

The graphical user interface 500 is a visual environment that preferably enables a user to view different charts, and provides additional functionality and options to a user via a display of icons, dialog boxes, and menus. A user may activate any of the display icons or menus by pointing and clicking on any of them with a selection input device, such as a mouse, one or more keys on a keyboard, a stylus, or using yet another input device. It should be understood that a trader could also set any parameters for performing chart studies and analysis through something other than a graphical user interface, such as through a command line entry.

As shown in FIG. 5, the graphical user interface 500 displays a line chart 502 that may represent traded prices, traded volume or yet some other quantity related to a tradeable object. Also, it should be understood that while FIG. 5 illustrates a line chart, any other chart types could also be used in relation to the example embodiments described herein for the chart pattern recognition and analysis. In one example embodiment, the graphical user interface 500 allows a user to select a portion of the chart 502 to be used in the chart pattern recognition, or analysis, or both. In one embodiment, a trader may select a portion of a chart by drawing around a desired portion of the chart. As illustrated in FIG. 5, a trader could select an icon 506 to draw on the graphical user interface 500, and to select a desired portion of the chart 500. However, it should be understood that different methods for selecting a desired chart portion could also be used. For example, a trader could also define a time period via another window, and a chart portion corresponding to the specified time period could be automatically selected by the chart pattern recognition and analysis application 204.

Alternatively, if a time axis is displayed in relation to the displayed chart, a user could select a portion of the chart by selecting two reference points on the time axis, and the selected reference points can be used to define a desired chart portion. It should be understood that a trader could view chart portions not being displayed on the graphical user interface 500 by selecting and moving a scroll bar 510, or yet using some other means. It should be understood that different options could also be used to define and select a desired chart portion.

A trader could also control the chart display, such as what type of a chart is displayed, by selecting different chart types using a chart type icon 508. Once the trader selects the chart type, the trader could also select a type of an item related to one or more tradeable objects, such as a last traded price or a last traded quantity, to be displayed on the chart. Also, additional chart manipulation functionality could be provided to a trader, such as functionality enabling the trader to zoom in and zoom out on different portions of the chart, to change the chart scale, or yet some other chart related functionality.

When a trader selects a desired chart portion, the trader could select a find matches icon 524 to search for similar matches. According to the example embodiments, the find matches icon 524 may give the trader two options, the first one, to search for any reoccurring chart pattern matches in the future, or, the second option, to look for similar chart patterns in the past. It should be understood that the trader could also select both options as well to be performed simultaneously. Also, preferably, a trader may be given a number of additional options to further customize his search. For example, one of the options given to a trader may enable the trader to define a timeframe to be used by the chart pattern recognition and analysis application 204 to find the matching chart portions. The time frame could be any time period in the past or any future time period, depending on the functional selection made by the trader.

If a trader wishes to search for similar chart patterns in the future, the chart pattern recognition and analysis application 204 may monitor data being plotted on the chart to detect similar chart patterns. As mentioned in earlier paragraphs, there are many currently existing chart pattern detection methods, and the example embodiments are not limited to any specific methods for detecting similarities in chart characteristics. If a similar chart pattern is detected, the chart pattern recognition and analysis application 204 can alert a user. It should be understood that the application 204 could be configured to monitor whether the chart pattern matches the chart pattern selected by a trader for a predetermined time period before alerting the trader that the match was found, and such a time period could be user-configurable or could be any preset default value. The alert can take many different formats, and may include any visual alerts, audio alerts, or the combination of both.

Upon alerting a user, the chart pattern recognition and analysis application 204 could continue monitoring the data being plotted in relation to the chart to determine the accuracy of its prediction. The accuracy data may then be used by the application 204 to generate a performance result report listing general or specific statistics. A trader may use the performance data to modify any existing settings. If the accuracy of predictions is low, a trader may wish to allow the chart pattern recognition and analysis application 204 to use a longer time period to decide if any chart pattern being monitored by the application 204 matches the chart pattern to be searched for by the application 204. Also, different modifications could also be made by a user based on the performance data.

In an embodiment where a trader wishes to find matches in a specific time period in the past, the graphical user interface 500 may display any matches found by the chart pattern recognition application 204, such as those illustrated at 512-518. It should be understood that a trader could define how many matches should be displayed via the interface 500, and the chart pattern recognition application 204 could prioritize and display to a trader only those matches that are closest to the selected chart pattern.

When the chart pattern recognition application 204 finds the matches, a trader may wish to further analyze the chart pattern by applying one or more studies to the found matches, and thus, determining a set of reoccurring indicator values associated with the pattern. However, before applying any studies, a trader could be able to eliminate those matches that a trader does not wish to be taken into consideration when applying one or more studies. In an embodiment illustrated in FIG. 5, a trader could mark which of the found matches should be eliminated using selection boxes displayed in relation to the chart matches, such as selection boxes 520 and 522. Depending on the configuration, a trader could also use the selection boxes to indicate which of the displayed chart matches should be used in the chart pattern analysis. In the embodiment where selection boxes are used to eliminate any found matches, a trader could select a "Remove X-Outs" icon 526 to eliminate the marked-up matches from any studies to be applied to the matches.

Once a trader selects found matches, a trader could apply different studies to the found matches. It should be understood that if a trader wishes to have more chart matches to perform a desirable study, the trader could increase a time period to be used by the chart pattern recognition and analysis application 204, and the new time period could be used to perform a second search. When a trader believes that he has enough matches, the trader may select an "Apply Study" icon 528 to view a list of available studies. The list of available studies may include many different types of studies, such as determining positions of different types of moving averages in relation to each chart pattern match, or determining values of momentum indicators, such as the ROC or RSI, determining a rate of change, stochastic indicator values, or other indicator values. The trader may then select one or more studies to be applied to the found matches.

When the chart pattern recognition and analysis application 204 applies the selected studies to the chart matches, such as, for example, finds a set of RSI values detected in relation to each chart pattern match, the chart pattern recognition application 204 can attempt to find a set of indicator values that is shared by all chart pattern matches, e.g., a reoccurring set of indicator value(s). For example, the application 204 could determine in relation to all matches under the study, that the RSI indicator value, or some other indicator value, was most of the time higher than a specific value "X." Alternatively, the application 204 could determine a range of indicator values detected in relation to all found chart matches. Also, it should be understood that rather than applying any technical studies, the chart pattern recognition and analysis application 204 could also study any other tradeable object related characteristics, such as traded volume during the occurrence of the chart patterns. The results of the studies could be displayed to a trader. Also, the results of the studies could be used by the chart pattern recognition and analysis application 204 in the process of detecting the same chart pattern in the future.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for chart pattern recognition and analysis may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A non-transitory computer readable medium having program instructions stored thereon, which when executed cause a processor to execute acts comprising:
    displaying a chart representing historical market data for a tradeable object, the historical market data including at least one of traded prices and traded volume for the tradeable object;
    receiving a user input to select a portion of the chart;
    determining characteristics of the selected portion of the chart;
    analyzing market data received from an electronic exchange to identify the characteristics of the selected portion of the chart in the received market data;
    in response to identifying the characteristics of the selected portion of the chart in the received market data, identifying a portion of the received market data having the characteristics of the selected portion of the chart as a reoccurring pattern; and responsively
    displaying an indicator of the reoccurring pattern.

2. The non-transitory computer readable medium of claim 1 where the chart comprises the historical market data displayed versus time.

3. The non-transitory computer readable medium of claim 1 where displaying the indicator comprises displaying the reoccurring pattern.

4. The non-transitory computer readable medium of claim 1 where the acts further comprise:
    identifying a plurality of portions of the received market data having the characteristics of the selected portion, each of the plurality of portions of the received market data being identified as the reoccurring pattern; and
    displaying a plurality of indicators of the reoccurring pattern, where each indicator of the plurality of indicators represents at least one of the plurality of portions of the received market data.

5. The non-transitory computer readable medium of claim 1 where the acts further comprise applying at least one chart pattern study to the reoccurring pattern.

6. The non-transitory computer readable medium of claim 5 where the at least one chart pattern study is selected from a plurality of chart pattern studies included at least one of determining positions of moving averages, determining values of momentum indicators, determining rate of change, determining stochastic values, determining a relative strength indicator, determining an average true range, identifying a volume, and combinations thereof.

7. The non-transitory computer readable medium of claim 1 where the selected portion comprises a start corresponding to an order to buy or sell the tradeable object being submitted and an end corresponding to execution of the order.

8. A method for market pattern recognition, the method comprising:
    displaying, via a computing device, a chart representing historical market data for a tradeable object, the historical market data including at least one of traded prices and traded volume for the tradeable object;
    receiving, via the computing device, a user input to select a portion of the chart;
    determining, via the computing device, characteristics of the selected portion of the chart;
    analyzing, via the computing device, market data received from an electronic exchange to identify the characteristics of the selected portion of the chart in the received market data;
    in response to identifying the characteristics of the selected portion of the chart in the received market data, identifying, via the computing device, a portion of the received market data having the characteristics of the selected portion of the chart as a reoccurring pattern; and responsively
    displaying, via the computing device, an indicator of the reoccurring pattern.

9. The method of claim 8 where the chart comprises the historical market data displayed versus time.

10. The method of claim 8 where displaying the indicator comprises displaying the reoccurring pattern.

11. The method of claim 8 further comprising:
    identifying a plurality of portions of the received market data having the characteristics of the selected portion, each of the plurality of portions of the received market data being identified as the reoccurring pattern; and
    displaying a plurality of indicators of the reoccurring pattern, where each indicator of the plurality of indicators represents at least one of the plurality of portions of the received market data.

12. The method of claim 8 further comprising applying at least one chart pattern study to the reoccurring pattern.

13. The method of claim 12 where the at least one chart pattern study is selected from a plurality of chart pattern studies included at least one of determining positions of moving averages, determining values of momentum indicators, determining rate of change, determining stochastic values, determining a relative strength indicator, determining an average true range, identifying a volume, and combinations thereof.

14. The method of claim 8 where the selected portion comprises a start corresponding to an order to buy or sell the tradeable object being submitted and an end corresponding to execution of the order.

15. A chart pattern analysis device comprising:
    a user input configured to receive an input from a user to select a portion of a chart of historical market data for a tradeable object including at least one of traded prices and traded volume for the tradeable object;
    a chart analyzer coupled with the user input and configured to determine characteristics of the selected portion of the chart;
    a market analyzer coupled with the chart analyzer and configured to analyze market data received from an electronic exchange to identify the characteristics of the selected portion of the chart in the received market data as a reoccurring pattern; and
    a display for displaying an indicator of the reoccurring pattern to the user.

16. The chart pattern analysis device of claim 15 where the chart of historical market data comprises the historical market data displayed versus time.

17. The chart pattern analysis device of claim 15 where displaying the indicator comprises displaying the reoccurring pattern.

18. The chart pattern analysis device of claim 15 where the market analyzer is further configured to identify a plurality of portions of the received market data having the characteristics of the selected portion, where the display is configured to display a plurality of indicators, where each indicator of the plurality of indicators represents at least one of the plurality of portions of the received market data.

19. The chart pattern analysis device of claim 15 further comprising a chart pattern analyzer configured to apply at least one chart pattern study to the reoccurring pattern.

20. The chart pattern analysis device of claim 19 where the at least one chart pattern study is selected from a plurality of chart pattern studies included at least one of determining positions of moving averages, determining values of momentum indicators, determining rate of change, determining stochastic values, determining a relative strength indicator, determining an average true range, identifying a volume, and combinations thereof.

21. The chart pattern analysis device of claim 15 where the selected portion comprises a start corresponding to an order to buy or sell the tradeable object being submitted and an end corresponding to execution of the order.

* * * * *